May 11, 1937.  J. GONZALEZ  2,079,992
LOCKING DEVICE FOR MOTOR VEHICLES
Filed Jan. 21, 1936   3 Sheets-Sheet 1
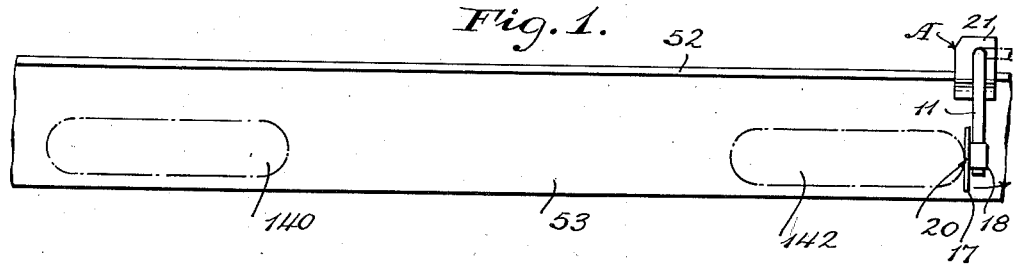
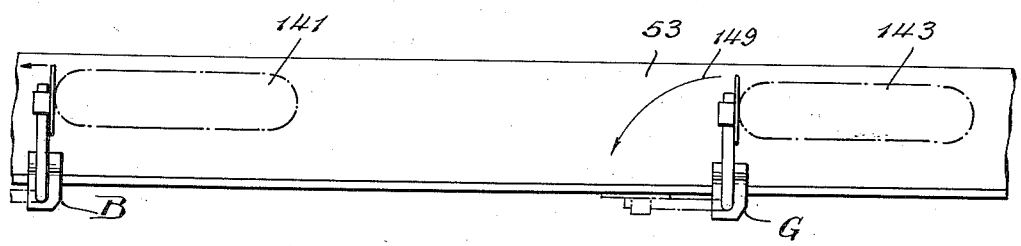
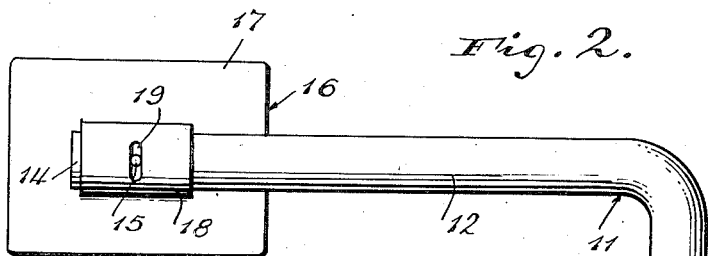
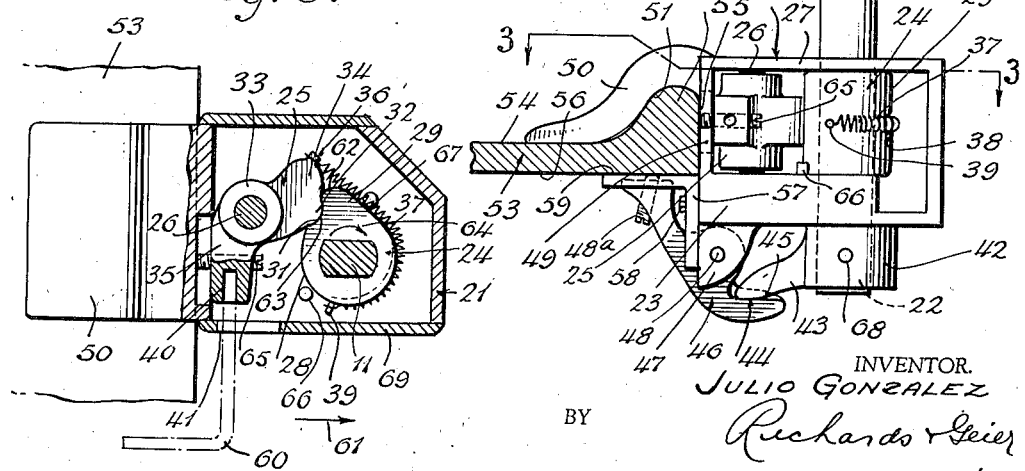
INVENTOR.
JULIO GONZALEZ
BY
Richards & Geier
ATTORNEYS May 11, 1937.  J. GONZALEZ  2,079,992
LOCKING DEVICE FOR MOTOR VEHICLES
Filed Jan. 21, 1936  3 Sheets-Sheet 2
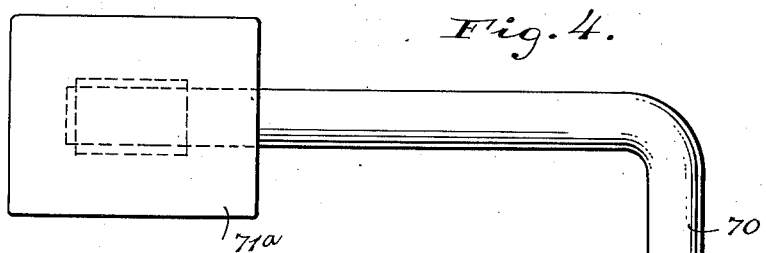
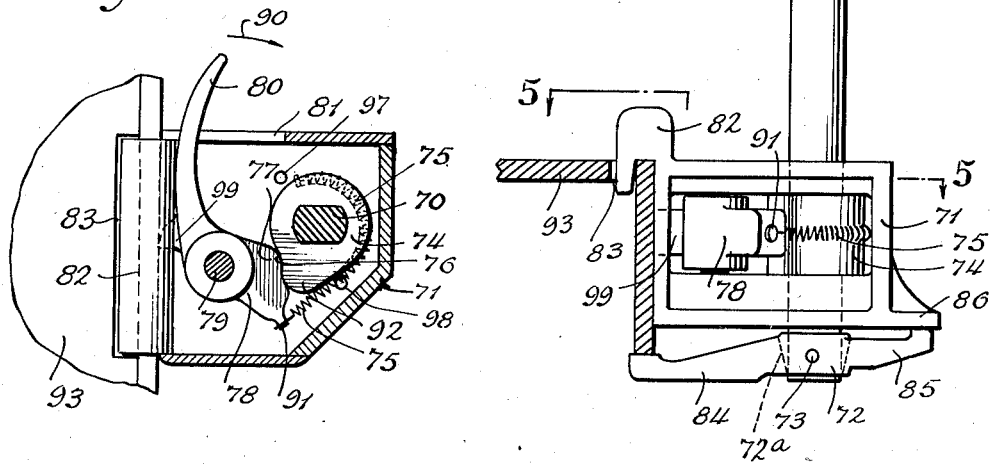
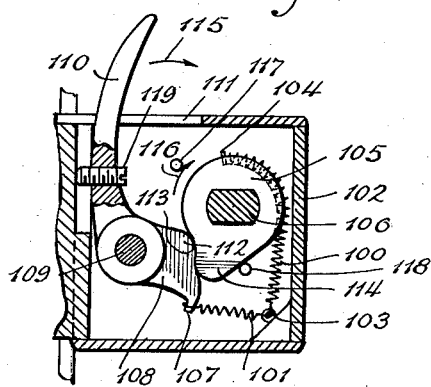
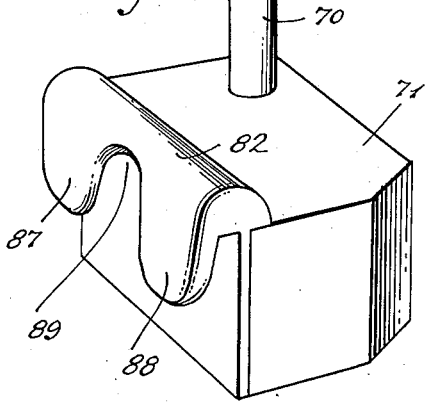
INVENTOR.
JULIO GONZALEZ
BY Richards & Geier
ATTORNEYS May 11, 1937.  J. GONZALEZ  2,079,992
LOCKING DEVICE FOR MOTOR VEHICLES
Filed Jan. 21, 1936   3 Sheets-Sheet 3
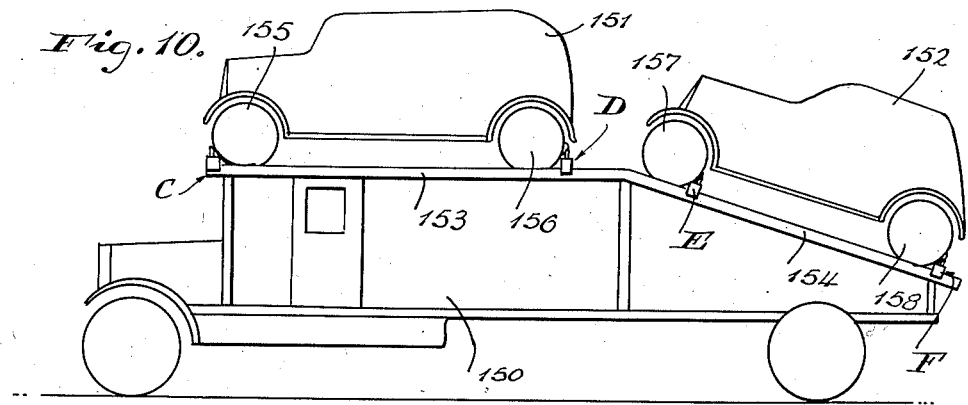
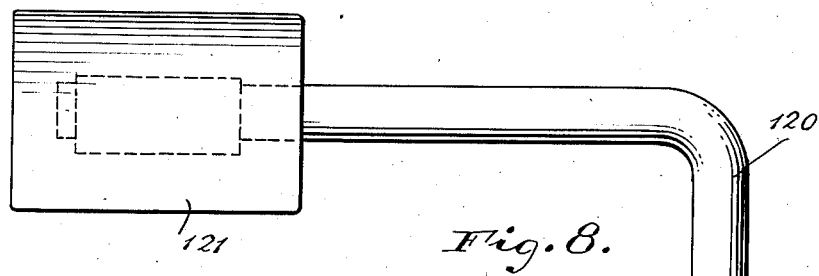
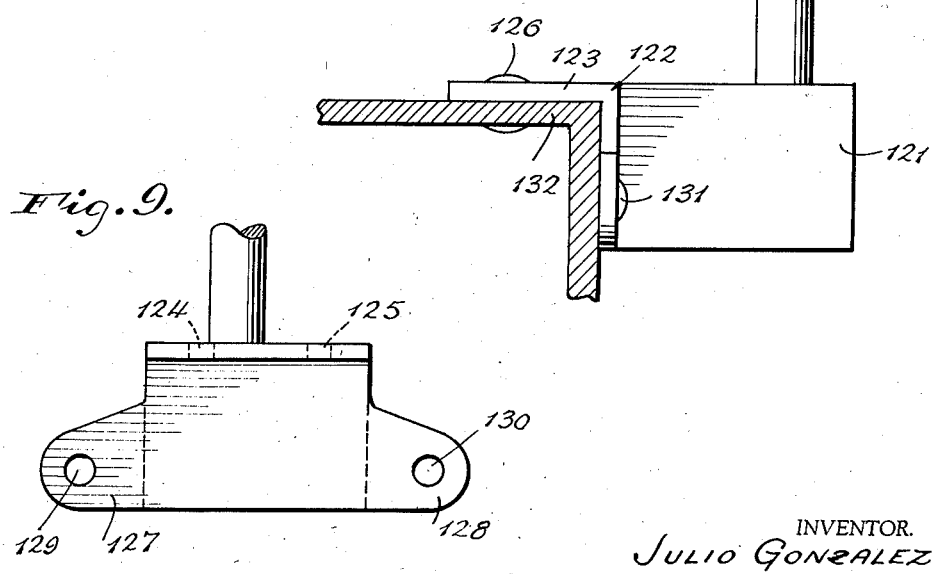
INVENTOR.
JULIO GONZALEZ
BY Richards & Geier
ATTORNEYS Patented May 11, 1937

2,079,992

UNITED STATES PATENT OFFICE 2,079,992

LOCKING DEVICE FOR MOTOR VEHICLES

Julio Gonzalez, Jersey City, N. J., assignor of one-half to Matthew A. Greenberg Application January 21, 1936, Serial No. 60,084

18 Claims. (Cl. 188—32)

This invention relates to a locking device and refers more particularly to a device for maintaining the wheels of motor cars and other vehicles in a predetermined position upon rails or other supporting surfaces.

An object of the present invention is the provision of a locking device of simple and inexpensive construction, through the use of which the rolling of a vehicle upon a supporting surface is easily and conveniently prevented.

Another object is the provision of a locking device which may be adjustably mounted upon a support for automobiles or other vehicles, and which will engage the wheels of such vehicles to prevent any movement of these wheels relatively to the support.

A further object is the provision of a locking device for vehicles which may be attached to a supporting surface of any suitable shape or form, and which may be adjusted to any desirable position upon said supporting surface.

Still another object of the present invention is the provision of a locking device which may be conveniently attached to automobile transporting trucks, movable rails, platforms or any other means which support a vehicle and which, at the same time, are movable along with said vehicle.

The above and other objects of the present invention may be realized through the provision of a bent arm, one end of which is adapted to contact the wheel of a vehicle, the other end of the bent arm being rotatably mounted in a casing provided with means gripping an edge of the surface supporting the vehicle.

That end of the bent arm which is rotatably mounted in the casing, is firmly connected and rotatable along with a member having a curved surface which cooperates with the curved surface of a locking member pivotally mounted in said casing, to lock the first-mentioned member and the bent arm in a position in which the bent arm is situated in the path of the wheel of a vehicle. The two members are disengaged through the use of a suitable key or lever which is adapted to move the second-mentioned member out of engagement with the first-mentioned member, whereupon resilient means situated within the casing will swing the first-mentioned member into an inoperative position.

The invention will appear more clearly from the following detailed description when taken in connection with the accompanying drawings showing by way of example preferred embodiments of the inventive idea.

In the drawings:

Figure 1 is a top view of a pair of rails provided with locking devices constructed in accordance with the principles of the present invention.

Figure 2 is a rear view of a locking device with certain parts shown in section.

Figure 3 is a section along the lines 3—3 of Figure 2.

Figure 4 is partly a front view of and partly a section through a device of a somewhat different form.

Figure 5 is a section along the lines 5—5 of Figure 4.

Figure 6 is a perspective view of the casing of the device illustrated in Figures 4 and 5.

Figure 7 is a horizontal section through a locking device provided with two separate springs.

Figure 8 is a front view of a locking device of a somewhat different form.

Figure 9 is a fragmentary side view of the locking device shown in Figure 8.

Figure 10 shows a transport for automobiles, the supporting surfaces of which are provided with locking devices constructed in accordance with the present invention.

The locking device shown in Figures 2 and 3 of the drawings comprises an angular arm 11 having a horizontal portion 12 and a vertical portion 13 extending at right angles to the horizontal portion 12. The end 14 of the arm 11 carries a pin 15. The end 22 of the arm 11 and that part of the arm 11 which passes through the casing 27 are preferably elongated in cross section, with two opposite round surfaces, as shown in Figure 3. The other portions of the arm 11 are preferably round in cross section.

An abutting member 16 comprises a substantially rectangular portion 17, the front surface 20 (Figure 1) of which is brought in contact with the wheel of a vehicle. This contacting surface 20 of the member 17 is preferably curved so that it may conform to the curvature of the wheel. The abutting member 16 is provided with a sleeve 18 which is placed upon the end 14 of the arm 11.

Preferably, the sleeve 18 is provided with a vertical slot 19 through which projects the pin 15. Due to this arrangement, the member 16 may be turned upon the arm 11 within the limits of the slot 19. When the operative surface 20 is brought in contact with the wheel of the motor vehicle, the member 16 will be able to adjust itself to the size and curvature of the wheel by turning upon the arm 11 under the pressure of the wheel.

The device for locking the arm 11 in its operative position shown in Figure 1, is situated within a casing 21. As shown in Figures 2 and 3, the end 22 of the bent arm 11 passes through suitable openings formed in the casing 21.

The bottom 23 of the casing 21 is considerably thicker than the other walls of the casing and serves as a support for a curved member 24 and the locking member 25. The curved member 24 is mounted upon that portion of the arm 11 which is situated within the casing 21, and is rotatable therewith. The locking member 25 is rotatably mounted upon a pivot 26 which is mounted in the top wall 27 and the bottom wall 23 of the casing 21.

As shown more clearly in Figure 3, the curved member 24, which is rotatable along with the arm 11, is provided with substantially cylindrical surfaces 28 and has a projecting portion 29 having an edge 62.

The locking member 25 comprises a central portion 33, which is provided with a bore hole surrounding the pivot 26. The portions 34 and 35 of the locking member 25 are situated substantially on opposite sides of the central portion 33. The portion 34 is provided with a projection 32 having an edge 63 and fitting into a corresponding groove 31 formed in the curved member 24. The same portion 34 of the locking member 25 is provided with an abutment 36 carrying one end of a coiled spring 37. As shown in Figure 2, the coiled spring 37 is partly situated within a groove 38 formed in the cylindrical surface 28 of the curved member 24. The opposite end of the spring 37 is attached to a pin 39 carried by the member 24.

The portion 35 of the locking member 25, which is situated on the opposite side of the portion 34, is provided with an opening 40. This opening, which has the form of a narrow bore hole, is situated opposite an opening 41 provided in the side wall 69 of the casing 21.

Stop pins 66 and 67 are carried by the bottom 23 of the casing 21 and are used for limiting the rotation of the curved member 24.

A sleeve 42 is mounted upon the end 22 of the bent arm 11 and is connected therewith by a pin 68 which passes through the sleeve 42 and the end portion 22. The sleeve 42 is provided with a projection 43 forming an integral part of the sleeve. The projection 43 has a cam surface 44 which presses against the surface 45 of a lever or support 46.

The casing 21 is provided one or more projections 47 which constitute an integral part of the bottom wall 23 of the casing 21. These projections carry a pin 48 which also passes through the lever 46, thus pivotally connecting the lever 46 with the casing 21. The upper portion of the lever 46 carries an adjustable bolt 48a, which is screwed into a threaded opening provided in the lever 46.

The side wall 49 and the top wall 27 of the casing 21 are firmly connected with a gripping member 50 which preferably constitutes an integral part of the casing 21.

As shown in Figure 2, the surface 51 of the gripping member 50 corresponds in form to the adjacent surface of the edge 52 of the support 53. In the example illustrated, the support 53 has a flat surface 54 carrying a wheel of a vehicle, and a raised edge 52, the gripping member 50 being placed over the edge 52.

The wall 49 of the casing 21 is provided with an opening. As shown in Figures 2 and 3, a bolt 65 carried by the portion 35 of the locking member 25 passes through this opening in the locked position of the device and engages the end surface 55 of the edge 52.

The edge 52 of the support 53 is gripped from the other side by the bolt 48a pressing against the lower surface 56 of the support 53.

Brackets 57 may be also provided for the purpose of maintaining the grip of the locking device upon the edge 52 of the support 53, only one of the brackets being illustrated in the drawings. Each of the brackets 57 consists of a piece of angle iron which is adjustably attached to the casing 21 by a bolt 58. The surface 59 of the bracket 57 is in engagement with the lower surface 56 of the support 53. The position of the bracket 57 upon the casing 21 may be adjusted by any suitable means, for instance, by means of an elongated slot (not shown) through which the bolt 58 is passed.

The device is operated as follows:

In the position shown in the drawings, the arm 11 is locked, since the projection 32 of the locking member 25 is situated within the groove 31 of the curved member 24. In this position the member 17 is situated in the path of the wheel of a vehicle, and will prevent the wheel from moving any further, as shown in Figure 1. Due to the simplicity of the construction of the device, it can be subjected to severe pressures without any danger of breakage.

In order to unlock the device, it is necessary to insert a key 60 (Figure 3) through the opening 41 formed in the wall 69 of the casing 21. The key 60, is inserted into the bore hole 40 provided in the locking member 25. The device is unlocked merely by moving the key 60 in the direction of the arrow 61 shown in Figure 3. This will cause the locking member 25 to swing around its pivot 26, thereby removing the projection 32 out of the groove 31 of the curved member 24, and increasing the tension of the spring 37. The spring 37 will press the edge 62 of the projecting portion 29 against the adjacent surfaces of the projection 32, until the edge 62 of the projection 29 is moved beyond the edge 63 of the projection 32.

As soon as the projection 62 has moved beyond the projection 63, the member 24 is freed and is swung by the spring 37 in a direction opposite to that of the arrow 64 until it is stopped by the pin 66.

The key 60 is not necessary for the purpose of locking the device, since such locking may be accomplished merely by rotating the arm 11 in the direction of the arrow 64. When the arm 11 is rotated in this manner, the tension of the spring 37 is gradually increased and the edge 62 of the projection 29 slides over the adjacent surfaces of the projection 32 until the members 24 and 25 assume the position shown in Figure 3. In this position the arm 11 is securely locked by the locking member 25.

At the same time the portion 43 of the sleeve 42 presses downward upon the lever 46, thereby causing the bolt 48a to press against the surface 56 of the support 53.

The casing 21 of the locking device is firmly attached to the support 53 by the bolt 48a carried by the lever 46 and by the bolt 65 carried by the locking member 25.

When the device is unlocked, the casing 21 is held upon the support 53 by the gripping member 50 and the bracket 57, and may be shifted along the edge 52 of the support 53 to a new position.

The locking device shown in Figures 4, 5 and 6 of the drawings is similar to the one described and comprises a bent arm 70, one end of which carries an abutting member 71a adapted to contact the wheel of a vehicle. The opposite end of the bent arm 70 passes through a casing 71 and carries a sleeve 72 which is attached to the arm 70 by means of the pin 73. The inner walls 72a of the sleeve 72 are conical in form, so that the sleeve 72 can turn slightly around the pin 73. A curved member 74, which is rotatable along with the arm 70, is situated within the casing 71 and carries one end of a coiled spring 75. The member 74 is provided with a projection 92 and a groove 76 which cooperates with the projection 77 of a locking member 78. The locking member 78 is rotatably mounted upon a pivot 79 carried by the casing 71 and comprises a lever 80 projecting through an opening 81 formed in the casing 71. The lever 80 is provided with a projection 99 which passes through an opening formed in the casing 71 and presses against a wall of the support 93 when the device is locked.

In the example illustrated, the casing 71 is provided with a hook-shaped gripping member 82, which constitutes an integral part of the casing 71. As shown in Figure 4, the support carrying the locking device has the form of an angle iron 93 provided with a slot 83 extending in the longitudinal direction of the support or rail 93. The gripping member 82 projects into the slot 83, thereby holding the casing 71 in place. The lower edge of the support 93 may be brought in contact with a projection 84 which forms an integral part of the sleeve 72 and which is rotatable along with the arm 70. Another projection 85 is situated on the opposite side of the projection 84 and also forms an integral part of the sleeve 72. The projection 85 contacts the support 86 which forms a part of the casing 71. The rail 93 is firmly gripped by the member 82, the projection 99 and the projection 84 when the locking device is in the locked position.

As shown in Figure 6, the gripping member 82 may comprise two separate projecting tongues 87 and 88, projecting through the slot 83 formed in the support 93 and separated by a cut-out portion 89.

In the position shown in Figures 4 and 5 of the drawings, the device is illustrated in its locked position. In order to unlock the device it is merely necessary to move the lever 80 in the direction of the arrow 90 shown in Figure 5. The locking member 78, swinging around its pivot 79 will move the projection 77 out of engagement with the groove 76 of the member 74. At the same time, the member 78 will pull at the spring 75 since an end of this spring is attached to the projection 91 of the member 78. The spring 75 will press the projection 92 of the member 74 against the adjacent surfaces of the locking member 78 until the projection 92 will move past the projection 77 of the member 78. Then the device will be unlocked so that the arm 70 may be freely turned within limits defined by the pins 97 and 98. The turning of the lever 80 will move the projection 99 out of engagement with the surface of the rail 93, thereby freeing the casing 71. Consequently, in the inoperative position of the device, the casing 71 with its arm 70 may be shifted lengthwise along the support 93 within the extent limited by the dimensions of the slot 83.

In order to lock the device, it is merely necessary to turn the arm 70 in the opposite direction until the projection 92 is moved past the projection 77. Then the projection 77 will be inserted into the groove 76 and the device will be locked again.

The device shown in Figure 7 of the drawings comprises two springs 100 and 101. The casing 102 of the device carries a pin 103 to which the adjacent ends of the springs 100 and 101 are attached. The opposite end of the spring 100 is attached to a pin 104 carried by a curved member 105 which is keyed upon the bent arm 106. The opposite end of the spring 101 is attached to the projection 107 of the locking member 108 rotatably mounted upon a pivot 109 carried by the casing 102. The locking member 108 comprises a lever 110 projecting through an opening 111 formed in the casing 102. The locking member 108 comprises also a projection 112 fitting into a groove 113 formed in the member 105 which is also provided with a projection 114. An adjustable bolt 119 which is carried by the lever 110, presses against a surface of the support carrying the vehicle. The rotation of the member 105 is limited by stop-pins 117 and 118.

The device operates in substantially the same manner as those already described. In order to unlock the device, the lever 110 is turned in the direction of the arrow 115 thereby extending the coiled spring 101 and moving the projection 112 beyond the projection 114. As soon as the projection 114 is freed, the spring 100 will turn the member 105 in the direction of the arrow 116, thereby unlocking the device. In order to lock the device, it is merely necessary to turn the arm 106 in a direction opposite to that of the arrow 116, until the projection 112 fits into the groove 113 of the member 105.

The device illustrated in Figures 8 and 9 of the drawings comprises a bent arm 120, one end of which carries the abutting member 121, which is adapted to contact the wheel of an automobile. The opposite end of the bent arm 120 is situated within a casing 121. The device for locking the arm 120 and for unlocking the same is similar to those already described and is not illustrated in the drawings. The casing 121 is firmly connected with or forms a part of an angular bracket 122. The horizontal portion 123 of the angular bracket 122 comprises two vertical holes 124 and 125 through which are passed the bolts or rivets 126. The vertical portion of the bracket 122 comprises two projections 127 and 128. The projection 127 is provided with an opening 129, while the projection 128 is provided with a similar opening 130. Bolts or rivets 131 may be passed through the openings 129 and 130. The bolts or rivets 126 and 131 are used for attaching the casing 121 of the locking device to the angular rail 132.

The practical application of the locking devices constructed in accordance with the principles of the present invention is illustrated in Figures 1 and 10 of the drawings. Figure 1 shows a pair of supports or rails 53 carrying the two front wheels 140 and 141 and the two rear wheels 142 and 143 of an automobile. The locking device A is in engagement with the right hand rear wheel 142 thereby preventing the motor car from rolling backwards. A second locking device B is in engagement with the left hand front wheel 141 of the automobile to prevent it from rolling forward. A locking device G may be placed in front of the rear wheel 143 and used instead of the locking device A. When the device G is unlocked its bent arm may be turned in the direction of the arrow 149 shown in Figure 1.

Figure 10 shows a motor truck 150 carrying two automobiles 151 and 152. The motor car 151 is supported upon a substantially flat surface 153, while the motor car 152 is carried by an inclined surface 154. Preferably four locking devices C and D are used for locking the automobile 151, only two of these devices being shown in the drawings. The locking devices C are situated in front of the front wheels 155 of the automobile 151, while the locking devices D are situated behind the rear wheels 156 of the car 151.

The motor car 152 is locked by four locking devices E and F each of which is situated behind its repective wheel and is carried by the inclined surface 154. In the example illustrated, the front wheels 157 of the automobile 152 are held by the locking devices E, while the rear wheels 158 are held by the locking devices F.

What is claimed is:

1. A locking device, comprising a bent arm having one end adapted to extend across the path of a wheel or other object to stop the same, a curved member carried by said arm at the opposite end thereof and rotatable along with said arm, a locking member adapted to engage said curved member to lock the same, a casing enclosing said curved member and said locking member, and means carried by said casing for attaching the same to a support adapted to carry said object.

2. A locking device, comprising a bent arm having one end adapted to extend across the path of a wheel or other object to stop the same, a curved member carried by said arm at the opposite end thereof and rotatable along with said arm, a locking member adapted to engage said curved member to lock the same, and resilient means connected with said curved member and said locking member and pressing said locking member against said curved member.

3. A locking device for vehicles, comprising a bent arm having one end adapted to extend across the path of a wheel of a vehicle to stop the same, a curved member carried by said arm at the opposite end thereof and rotatable along with said arm, a locking member adapted to engage said curved member to lock the same, a casing containing said curved member and said locking member, and gripping means carried by said casing for gripping a support carrying said wheel.

4. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, means carried by said casing for attaching said casing to a support for said object, and resilient means pressing said locking member against said curved member.

5. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, means carried by said casing for attaching said casing to a support for said object, and a coiled spring connected with said locking member and said curved member and pressing the two members against each other.

6. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, means carried by said casing for attaching said casing to a support for said object, a spring connected with said casing and said curved member, and another spring connected with said locking member and said casing, said springs pressing said locking member and said curved member against each other.

7. A locking device, comprising a bent arm having a portion adapted to extend across the path of the object to be locked, a curved member having a groove formed therein and rotatable along with said arm, a locking member having a projection which fits into said groove, when said locking member is in its locking position, a casing enclosing said curved member and said locking member, means carried by said casing for attaching said casing to a support for said object, and a spring connected with said locking member and said curved member and pressing said locking member against said curved member, said locking member and said casing having openings formed therein for the insertion of a key to turn said locking member out of its locking position, thereby moving said projection out of said groove against the pressure of said spring and unlocking the device.

8. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, means carried by said casing for attaching said casing to a support for said object, resilient means pressing said locking member against said curved member, and a lever connected with said locking member and extending through an opening formed in said casing.

9. A locking device, comprising a bent arm having a portion adapted to extend across the path of the object to be locked, a curved member having a groove formed therein and rotatable along with said arm, a rotatable locking member having a projection fitting into said groove in the locked position of said locking member, a casing enclosing said curved member and said locking member, means carried by said casing for attaching said casing to a support for said object, a spring connected with said curved member and said locking member, said curved member having another projection situated adjacent said groove, a rotation of said rotatable locking member from said locked position causing a tension of said spring and a removal of the first-mentioned projection from said groove, whereby said spring moves the second-mentioned projection past the first-mentioned projection, thereby unlocking the device.

10. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, means carried by said casing for attaching said casing to a support for said object, resilient means pressing said locking member against said curved member, and an abutting member, that end of the bent arm which is adapted to extend across the path of said object carrying said abutting member which contacts said object to prevent further movement thereof.

11. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, means carried by said casing for attaching said casing to a support for said object, resilient means pressing said locking member against said curved member, an abutting member adapted to contact said object to prevent further movement thereof, said abutting member being rotatably mounted upon that portion of said arm which is adapted to extend across the path of said object, and means for limiting the rotation of said abutting member relatively to the portion of the arm carrying the same.

12. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, resilient means pressing said locking member against said curved member, a gripping member carried by said casing and adapted to be placed over an upper edge of a support adapted to carry said object, a member adapted to engage the lower edge of said support, and means connecting the last-mentioned member with said arm.

13. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, resilient means pressing said locking member against said curved member, a gripping member connected to said casing and adapted to be placed over the upper edge of a supporting surface adapted to carry said object, a lever, means pivotally connecting said lever intermediate its ends with said casing, a bolt carried by one end of said lever and adapted to engage a lower edge of said supporting surface, and means connected with said arm and pressing against the opposite end of said lever.

14. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, resilient means pressing said locking member against said curved member, a gripping member connected to said casing and adapted to be placed over the upper edge of a supporting surface adapted to carry said object, and an adjustable bracket carried by said casing and contacting the lower edge of said supporting surface.

15. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, resilient means pressing said locking member against said curved member, a gripping member connected to said casing and adapted to be placed over the upper edge of a supporting surface adapted to carry said object, and a sleeve carried by said arm and rotatable therewith, said sleeve having a projection adapted to engage the lower edge of said supporting surface.

16. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, resilient means pressing said locking member against said curved member, and a gripping member connected with said casing and adapted to be inserted into an opening provided in a support adapted to carry said object.

17. A locking device, comprising a bent arm having a portion adapted to extend across the path of the object to be locked, a curved member having a groove formed therein and rotatable along with said arm, a locking member having a projection fitting into said groove, a casing enclosing said curved member and said locking member, resilient means pressing said locking member against said curved member, a gripping member connected with said casing and adapted to be inserted into an opening provided in a support adapted to carry said object, said gripping member having the shape of a hook surrounding the upper edge of said support, and a sleeve rotatable along with said arm, said sleeve having a projection engaging a lower edge of said support.

18. A locking device, comprising rotary means having one end adapted to extend across the path of a wheel or other object to stop the same, a locking member adapted to engage said rotary means to lock the same, and means rotatably supporting the first-mentioned means for attaching the same to a support adapted to carry said object.

JULIO GONZALEZ.